Figures 1, 2:
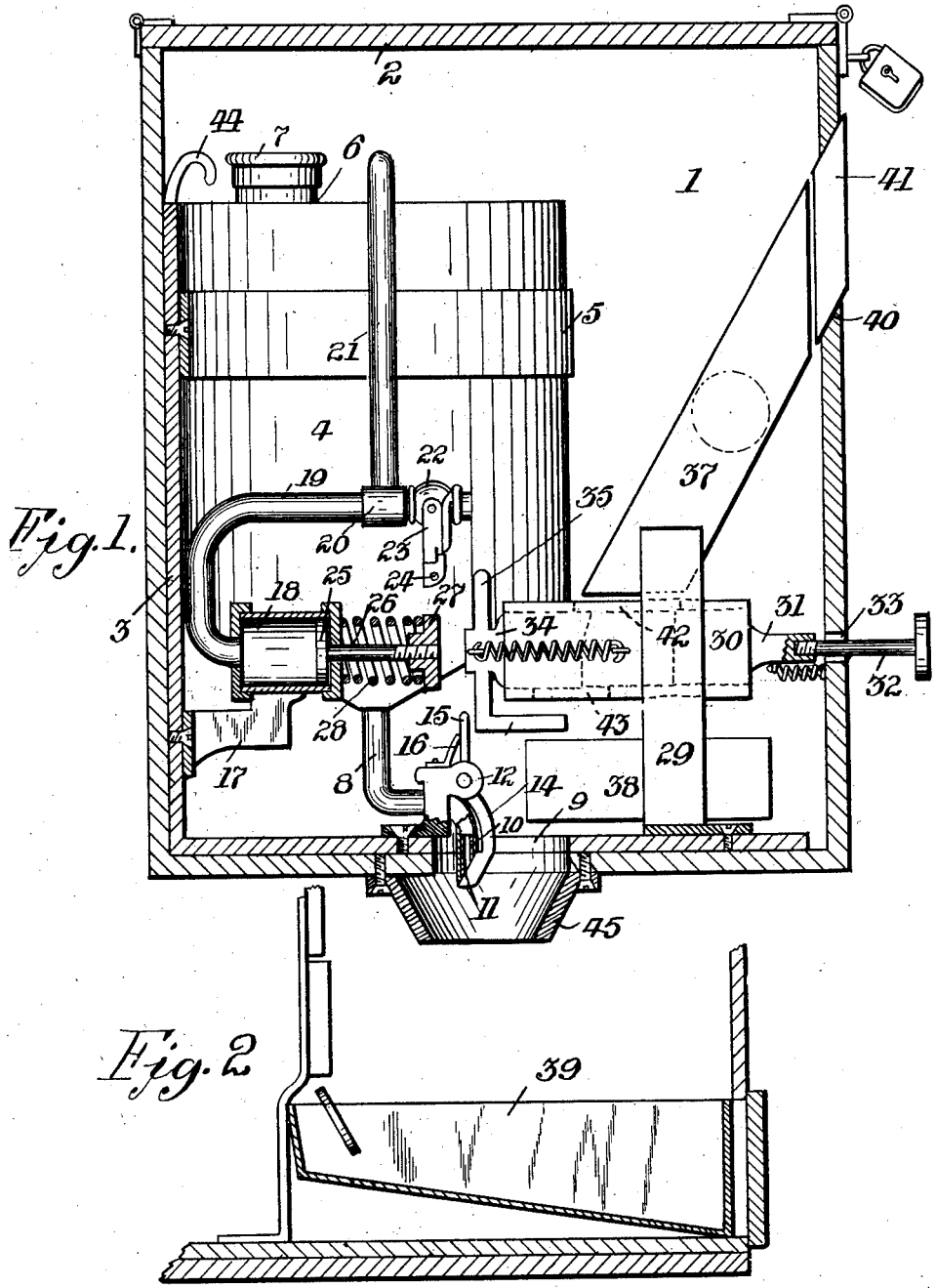

No. 826,725. PATENTED JULY 24, 1906.
A. F. HUMPHREY, H. McCRORY & F. D. SAUPP, Jr.
MACHINE FOR DELIVERING LIQUIDS.
APPLICATION FILED JUNE 7, 1905.

2 SHEETS—SHEET 1.

Witnesses.
K. H. Butler
E. A. Rudolph.

Inventors.
Alexander F. Humphrey
Henry McCrory & Frank D. Saupp, Jr.

By A. C. Evert & Co.
Attorneys.

No. 826,725. PATENTED JULY 24, 1906.
A. F. HUMPHREY, H. McCRORY & F. D. SAUPP, Jr.
MACHINE FOR DELIVERING LIQUIDS.
APPLICATION FILED JUNE 7, 1905.

2 SHEETS—SHEET 2.

Witnesses.

Inventors.
Alexander F. Humphrey,
Henry McCrory & Frank D. Saupp, Jr.

By
Attorneys.

UNITED STATES PATENT OFFICE.

ALEXANDER F. HUMPHREY, OF ALLEGHENY, HENRY McCRORY, OF WILKINSBURG, AND FRANK D. SAUPP, JR., OF PITTSBURG, PENNSYLVANIA.

MACHINE FOR DELIVERING LIQUIDS.

No. 826,725.   Specification of Letters Patent.   Patented July 24, 1906.

Application filed June 7, 1905. Serial No. 264,113.

*To all whom it may concern:*

Be it known that we, ALEXANDER F. HUMPHREY, residing at Allegheny, HENRY McCRORY, residing at Wilkinsburg, and FRANK D. SAUPP, Jr., residing at Pittsburg, in the county of Allegheny, State of Pennsylvania, citizens of the United States of America, have invented certain new and useful Improvements in Machines for Delivering Liquids, of which the following is a specification, reference being had therein to the accompanying drawings.

This invention relates to certain new and useful improvements in machines for delivering liquid; and the invention relates more particularly to a machine designed for delivering predetermined quantities of liquid, such as perfumery.

To this end the invention aims to provide a machine comprising positive and reliable means for effecting a perfect discharge of predetermined quantities of liquid which is contained within a suitable receptacle. In this connection the invention is primarily intended as a machine adapted to be manually operated to deliver a prescribed quantity of perfumery upon a handkerchief or the like article.

The machine as an entirety primarily involves a combination with a suitable coin-controlling mechanism, said mechanism having means for positioning, temporarily holding, and releasing a coin, said coin, together with a plunger, serving to actuate mechanism adapted to release a quantity of perfumery. In connection with the discharge-controlling mechanism we employ valves for automatically controlling the passage of perfumery from its reservoir or receptacle and means for returning the movable and actuated parts of the mechanism to their normal position ready to be again manually operated in connection with a coin.

With these and many other objects in view, which will more readily appear as the nature of the invention is better understood, the same consists in the novel construction, combination, and arrangement of parts, which will be more fully described, illustrated, and claimed hereinafter.

The essential features of the present invention involved in carrying out the objects above specified are necessarily susceptible to structural change without departing from the spirit of the invention; but the preferred embodiments are shown in the accompanying drawings, in which—

Figure 3:
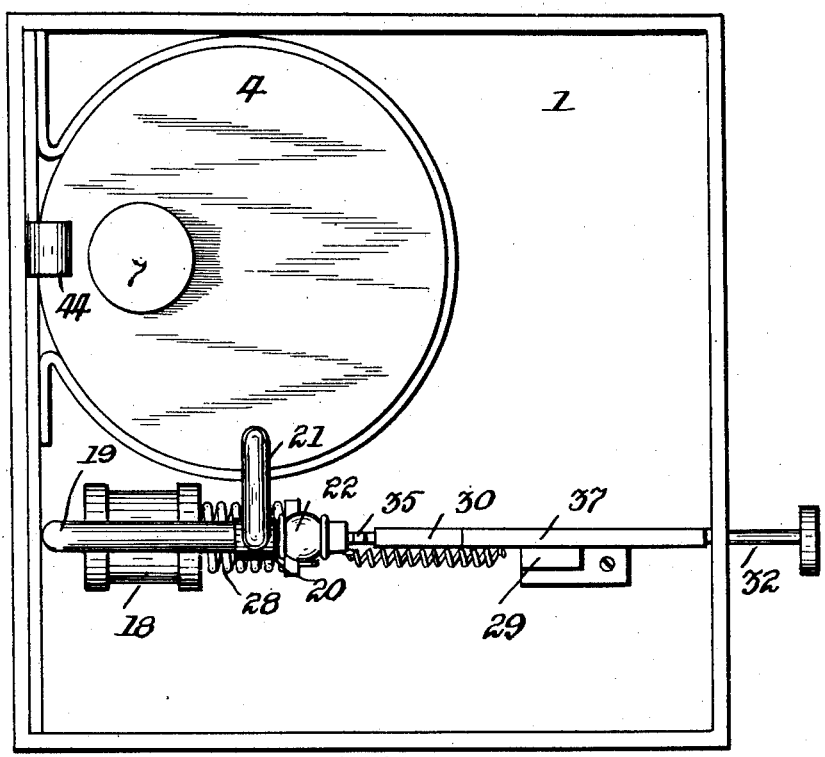

Figure 1 is a vertical sectional view of the casing of our improved machine, illustrating the operating mechanism and the reservoir in side elevation. Fig. 2 is a vertical sectional view of a portion of the casing, illustrating a coin receptacle or drawer used in connection with the machine. Fig. 3 is a top plan view of the operating mechanism of the machine, the lid or cover of the casing being removed.

Referring to the drawings accompanying this application, the reference-numeral 1 designates a suitable casing, which may be constructed either of wood or metal. The casing may be rectangular or cylindrical in shape and is adapted to be supported from a wall or a suitable standard. This casing is provided with a hinged lid or cover 2, adapted to be locked in a closed position. The casing may be made ornamental in design, and within said casing we place a substantially L-shaped frame 3, adapted to support a reservoir or receptacle 4, the coin-controlling mechanism, and the mechanism for controlling the discharge of the contents of the receptacle or reservoir. These mechanisms are placed upon the frame 3, whereby they can be easily and quickly removed from the casing 1 should they need repairing, and we have constructed said mechanisms whereby they will be free from all danger of injury incurred by the use of the same.

The reservoir 4 is attached to the frame 3 by a suitable strap 5, and the top of said reservoir is provided with a spout 6, having a suitable cap or cover 7, which can readily be removed when it is desired to refill or cleanse the reservoir or receptacle. The bottom of the reservoir is provided with an angular discharge-pipe 8, the end of which protrudes through openings 9, formed centrally of the frame 3 and the bottom of the casing 1. The end of the pipe 8 is provided with a lining-sleeve 10, and the end of said pipe and said sleeve are cut away to provide an angularly-disposed face 11.

Adjacent to the openings 9 we provide the frame 3 with an upwardly-extending bracket 12, in which is pivotally mounted a lever 14, the lower end of which is adapted to engage the beveled end of the pipe 8 and close said pipe. The upper end 15 of the lever 14 bears against a spring 16, carried by the bracket 12. The lever 14 constitutes a valve for controlling the discharge of perfumery, and this valve is to be actuated by a coin-controlling mechanism which will be presently described.

The frame 3 upon one side of the reservoir is provided with a bracket 17, which supports a cylinder 18. One end of said cylinder is connected by a curved pipe 19 to a T connection 20, which communicates with the interior of the receptacle or reservoir 5 by a substantially inverted-U-shaped pipe 21. The T connection 20 carries a valve 22, adapted to admit air to the reservoir or receptacle 5 to compensate for the amount of perfumery ejected from the reservoir. The valve 22 is controlled by a spring-actuated lever 23, carrying upon its lower end a pivoted dog 24, which can only be swung in one direction.

In the cylinder 18 is mounted a piston-head 25, carrying a piston-rod 26. The outer end of the piston-rod is screw-threaded to receive a flanged nut 27, and between this nut and the head of the cylinder 18 is mounted a coiled spring 28, which surrounds the piston-rod 26. The nut 27 is employed to adjust the stroke of the piston-rod 26, the tension of the spring 28 serving to retard the rearward movement of the plunger, consequently the force at which the air admitted by the valve 22 is injected into the receptacle or reservoir.

The frame 3 is provided with a standard 29, adapted to support a horizontally-arranged guide-casing 30, in which is slidably mounted a plunger 31, carrying a detachable headed rod 32, that extends through an opening 33, formed in the front wall or side of the casing 1. In the opposite end of the guide-casing 30 is mounted a spring-retained member 34, having an upwardly-extending projection 35 and a depending L-shaped arm 36. The standard 29 also supports a coin-chute 37 and may support a coin-receptacle 38.

In Fig. 2 of the drawings we have illustrated a receptacle 39, conforming to a drawer which is adapted to slide in the casing 1 and be locked therein by suitable means. This drawer may be used in lieu of the receptacle 38. (Illustrated in Fig. 1 of the drawings.) The front or side wall of the casing 1 is provided with a vertically-disposed slot 40, which may be provided with a sleeve or an escutcheon-plate 41 to guide the coins into the chute 37 and into the guide-casing 30. The top of the guide-casing is provided with a suitable slot (designated 42) to admit coins and with a slot 43 to permit of the coins dropping into the receptacle 38 after they have served their purpose.

The substantially L-shaped frame 3 is provided with a suitable handle, preferably conforming to a hook, as indicated at 44, whereby the frame can be bodily removed from the box or casing 1.

In operation we will assume that a quantity of air is in the cylinder 18, and to cause a quantity of perfumery to be ejected from the machine a coin of a suitable denomination is deposited in the machine through the slot 41. The coin then drops down the chute 37 through slot 42 into the guide-casing 30, where it forms a connecting-link between the plunger 31 and the spring-retained member 34. Upon the operator pushing inwardly upon the headed rod 32 the coin is moved forwardly until it reaches the slot 43, when it drops into a suitable receptacle. The forward movement of the coin actuates the member 34, which strikes the flanged nut 27 and moves the piston-head 25 rearwardly. This operation has caused the air contained within the cylinder 18 to be forced upwardly through the pipes 19 and 21 into the reservoir or receptacle 4. Simultaneously with the forward movement of the member 34 the arm 36 strikes the upper end 15 of the lever 14 and opens the discharge end of the pipe 8, permitting a quantity of perfumery to be deposited upon a handkerchief or the like article. The springs 16 and 28 are adapted to return their respective parts to their normal position, the spring-actuated member 34 having returned to its normal position when the coin passed through the slot 43.

The return movement of the spring-actuated member 34 causes the projection 35 to strike the pivoted dog 24 of the valve 22, said dog having receded and passed over the projection 35 upon its forward movement. When the projection 35 engages the dog 24 on its return movement, the valve 22 is opened to admit a prescribed quantity of air to the cylinder 18, the quantity being determined by the length of time the dog 24 is moved by the projection 35. After the dog has been actuated by the projection 35 the valve 22 is turned by the spring-actuated arm 23 and caused to return to its normal position, and the machine is in position to be operated again by depositing a coin therein. We have employed a suitable spout 45 to protect the protruding end of the discharge-pipe 8; but in some instances this spout may be readily dispensed with.

In order that the amount of air ejected into the reservoir or receptacle 4 may be regulated, the flanged nut 27 can be adjusted upon the piston-rod 26. Consequently the stroke of the piston-head can be governed. Another and very important feature of our invention resides in the novel construction of the frame 3. We have made this frame so it can be conveniently removed from the casing 1 by simply removing the rod 32, which is threaded into the plunger 31. The receptacle or reservoir 4 can be conveniently refilled when it is removed from the casing, and the adjustable parts of the machine can also be readily manipulated when the operating mechanism as an entirety is removed.

We do not care to confine ourselves to the use of the coin-controlling mechanism employed to actuate the operating mechanism of the machine, as the machine may be constructed to conform to various shapes where the type of coin-controlling mechanism which we have illustrated would be a disadvantage and could not be used. Therefore we may employ other coin-controlling mechanism than that illustrated to accomplish the same purpose.

It is thought from the foregoing that the construction, operation, and advantages of the herein-described machine will be apparent without further description, and various changes in the form, proportion, and minor details of construction may be resorted to without departing from the spirit of the invention or sacrificing any of the advantages thereof.

What we claim, and desire to secure by Letters Patent, is—

1. In a machine of the type described, the combination with a suitable casing, of a frame detachably mounted within said casing, a reservoir carried by said frame, a cylinder supported by said frame, pipes carried by said reservoir, one of said pipes communicating with said cylinder, an air-valve located upon said last-named pipe, a valve carried by the other of said pipes, a spring-retained plunger mounted within said casing and adapted to be operated from without said casing, a piston mounted in said cylinder and actuated by said plunger, said plunger being adapted to operate the last-named valve when moving in one direction and actuate said air-valve when moving in an opposite direction, substantially as described.

2. In a machine of the type described, the combination with a suitable casing, of a frame detachably mounted within said casing, a reservoir carried by said frame, a cylinder supported by said frame and communicating with said reservoir, a plunger slidably supported by said frame, a discharge-pipe carried by said reservoir, a spring-actuated valve mounted adjacent to the discharge end of said pipe and adapted to be actuated by the forward movement of said plunger, means actuated by the forward movement of said plunger to force air into said reservoir, and means actuated by the rearward movement of said plunger to admit air into said cylinder, substantially as described.

3. In a machine of the type described, the combination with a suitable casing, of a frame detachably mounted in said casing, a reservoir carried by said frame, a discharge-pipe leading from said reservoir, a plunger mounted upon said frame, means to temporarily hold the contents of said reservoir within said discharge-pipe, means actuated by the forward movement of said plunger to force air into said cylinder, and means simultaneously actuated by said plunger to release the first-named means, substantially as described.

4. In a machine of the type described, the combination with a suitable casing and a reservoir arranged in said casing, of an air-compressing device, a pipe leading from said air-compressing device into the upper part of the reservoir, a valve arranged on said pipe, a discharge-pipe leading from the bottom of the reservoir to the outside of the casing, a valve closing said discharge-pipe and means extending outside of the casing for successively operating the air-compressing device, the valves on the pipe leading therefrom to the reservoir and the valve on the discharge-pipe leading from the reservoir, in the order named.

In testimony whereof we affix our signatures in the presence of two witnesses.

ALEXANDER F. HUMPHREY.
HENRY McCRORY.
FRANK D. SAUPP, Jr.

Witnesses:
A. M. WILSON,
K. H. BUTLER.